United States Patent
Hu et al.

(10) Patent No.: US 12,347,613 B2
(45) Date of Patent: Jul. 1, 2025

(54) CONDUCTION COOLED SUPERCONDUCTING UNDULATOR

(71) Applicant: UCHICAGO ARGONNE, LLC, Chicago, IL (US)

(72) Inventors: Hong Hu, Bothell, WA (US); Matthew Kasa, New Lenox, IL (US); Ethan Anliker, Oswego, IL (US); Yury Ivanyushenkov, Darien, IL (US); Yuko Shiroyanagi, Darien, IL (US); Ibrahim Kesgin, Naperville, IL (US); Quentin B. Hasse, Oswego, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1071 days.

(21) Appl. No.: 17/332,633

(22) Filed: May 27, 2021

(65) Prior Publication Data
US 2022/0384074 A1 Dec. 1, 2022

(51) Int. Cl.
*H01F 6/04* (2006.01)
*H05H 7/04* (2006.01)
*H01S 3/09* (2006.01)

(52) U.S. Cl.
CPC .............. *H01F 6/04* (2013.01); *H05H 7/04* (2013.01); *H01S 3/0903* (2013.01); *H05H 2007/041* (2013.01)

(58) Field of Classification Search
CPC ...... H01F 6/04; H05H 7/04; H05H 2007/041; H01S 3/0903
See application file for complete search history.

(56) References Cited

U.S. PATENT DOCUMENTS

| 4,688,132 A | 8/1987 | Dustmann |
| 8,694,066 B2 | 4/2014 | Wang et al. |
| 2017/0184975 A1* | 6/2017 | Nikipelov ............. H01S 3/0903 |

FOREIGN PATENT DOCUMENTS

| WO | WO-2011127632 A1 | 10/2011 |
| WO | WO-2015060536 A1 | 4/2015 |
| WO | WO-2017072174 A1 | 5/2017 |

* cited by examiner

*Primary Examiner* — Mohamad A Musleh
(74) *Attorney, Agent, or Firm* — MARSHALL, GERSTEIN & BORUN LLP

(57) ABSTRACT

Superconducting undulators (SCUs) require thermal control of large heat loads for proper operation and to provide high radiation output powers. A conduction cooling apparatus for an SCU device includes a beam chamber having a hollow core inside of the beam chamber along a length of the beam chamber. The hollow core allows charged particles to pass through the hollow core of the beam chamber to generate output radiation. A beam chamber holder is physically and thermally coupled to the beam chamber to maintain a position, and control a temperature of, the beam chamber. At least one magnet is configured to provide a magnetic field to the hollow core, and at least one cooling bar is physically and thermally coupled to the magnet. A cooling source is thermally coupled to both the beam chamber holder and the cooling bar to provide cooling capacity to the beam chamber and the magnet.

20 Claims, 14 Drawing Sheets

TABLE I
40K Heat Load

| Location | Heat Load (W) |
|---|---|
| Beam Chamber Transition (from two ends of cryostat) | 6.0 |
| Conduction heat through main current lead (300K to 40K 7/16" CrCuA)( x4 pairs) | 79 |
| Conduction heat through correction current lead (300K to 40K)( x16 pairs) | 64 |
| Conduction through the center kicker magnet lead (one pair) | 7.0 |
| Suspensions (both horizontal and vertical) | 6.0 |
| Thermal radiation from RT to shield (30 layer of MLI) | 3.8 |
| Instrumentation (160 phosphor 32AWG.1 mx2) | 0.25 |
| Beam Heat (Resistive heating and radiation heating) | 196.7 |
| Joule Heat through main current lead | 37.4 |
| Joule Heat through correction current lead | 33.3 |
| Joule Heat through the kicker magnet lead | 2.0 |
| Total 1st stage heat load | 437.5 |

FIG. 4

Temperature [K], Time = 0 s, Steady State, Loopct=18348/50000

TABLE III
4K Heat Load

| Location | Heat Load (W) |
|---|---|
| Conduction heat through HTS leads (main magnets and correction magnets) | 0.46 |
| Thermal radiation from thermal shield and beam chamber | 0.2 |
| Suspensions | 0.07 |
| Instrumentation(160 phosphor bronze lm)x2 | 0.01 |
| Radiation penetrating through the beam chamber to the magnet [6.7] | 1.3 |
| Thermal Margin (extra heat due to various during manufacture) | 0.5 |
| Total 2nd stage heat load (beam +450A current) | 2.5 |

FIG. 6

Temperature [K], Time = 0 s, Steady State, Loopct=18348/50000

CONDUCTION COOLED SUPERCONDUCTING UNDULATOR

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for cooling superconductor devices, and specifically to conduction based cooling of superconducting undulators.

BACKGROUND

In contemporary high brightness synchrotron and free electron laser (FEL) radiation sources, undulators serve as the primary source of radiation. Undulators provide high brightness radiation beams with narrow spectral peaks, reducing unnecessary or unwanted spectral content and increasing the efficiency of the device for multiple applications. Undulators, as parts of storage ring-based synchrotron light sources or FELs, can be configured to generate radiation across a broad range of frequencies or energies, for example x-ray radiation with wavelengths near 0.1 nanometers, or radiation in the far-infrared range from 400 to 1000 microns. Another feature of undulator radiation is its high collimation and, as a result, the ability to focus x-ray beams to very small probes. The potential for single spectral mode operation of undulators, along with the ability to create devices operating at a broad range of energies, makes undulator technologies highly attractive for a multitude of unique experiments and technological applications. For example, undulator devices provide radiation that is useful for medical imaging, biomedical applications, polarization modulation spectroscopy, optical engineering, solid state physics, biology, and metrology, among other applications.

An undulator is a magnetic device used in high-energy physics that consists of a periodic arrangement of magnets or magnetic fields. FIG. 1 illustrates a typical embodiment of an undulator device 100. An electron 102 with an initial injection path 104 is injected into the undulator device 100 with a first row of magnets 106$a$-$j$ and a second row of magnets 107$a$-$j$ that is apart from and opposes the first row of magnets 106$a$-$j$. The two rows of magnets 106$a$-$j$ and 107$a$-$j$ induce magnetic fields between them. The first set of magnets 106$a$ and 107$a$ with upward pointing arrows denote magnets configured to create a magnetic field with field lines coming out of the page, or the plane of electron motion, represented by the dots between the first set of magnets 106$a$ and 107$a$, while magnets with downward pointing arrows, such as the second set of magnets 106$b$ and 107$b$ in each row, denote magnets configured to create a magnetic field with field lines going into the page, or the plane of electron motion, represented by the x's between the second set of magnets 106$b$ and 107$b$. Although the magnetic field line dots and x's are only shown between the first two sets of magnets 106$a$ and 107$a$, and 106$b$ and 107$b$, magnetic fields exist between each set of magnets in FIG. 1 with fields going into or out of the page corresponding to the respective down and up arrows on the magnets.

As the electron 102 moves into the first magnetic field between the first set of magnets 106$a$ and 107$a$, the magnetic field induces a change in the direction of the trajectory of the electron 102 causing the electron 102 to move in an upward direction in the plane of the page. Once the electron 102 has moved out of the first magnetic field between the first set of magnets 106$a$ and 107$a$ into the second magnetic field between the second set of magnets 106$b$ and 107$b$ the magnetic field is reversed, or in an opposite direction, to the first magnetic field between the first set of magnets 106$a$ and 107$a$. Therefore, the second magnetic field between the second set of magnets 106$b$ and 107$b$ causes the trajectory of the electron 102 to accelerate in a direction opposite to that of the induced trajectory change due to the first magnetic field between magnets 106$a$ and 107$a$. As the electron 102 travels from one magnetic field to the next through the undulator device 100, the periodic reversing or switching of the magnetic field direction causes the trajectory of the electron 102 to oscillate or undulate as illustrated by the oscillatory trajectory 110 shown in FIG. 1. By changing the direction or the trajectory of the electron 102, the periodic magnetic field accelerates the electron in an oscillatory pattern. As a result, the electron 102 emits electromagnetic radiation 112 defined by the electron's oscillatory trajectory. The wavelength, polarization, and intensity of the emitted electromagnetic radiation 112 depend on the strength of the magnets, the period of the magnetic field oscillation, the length of the undulator, and the direction and pattern of the periodic magnetic fields, among other factors. In fact, characteristics of the emitted electromagnetic radiation may be tunable, for example the wavelength of the emitted electromagnetic radiation may be tuned by controlling the energy of the electron, or by adjusting the magnetic-field strength of the magnets.

The electron 102 may be one of multiple electrons in an electron beam. The intensity of the emitted electromagnetic radiation 112 is linearly dependent on the number of electrons in an electron beam passing through the undulator device 100. For major parts of the spectrum, the radiation emitted from different electrons 102 in an electron beam passing through the undulator device 100 is incoherent due to random locations of the electrons 102 in space and time. Under special conditions, applied to the electron beam, and with a long enough undulator, the interaction of the emitted electromagnetic radiation 112 with the electrons 102 in the electron beam could cause the electrons 102 to clump into microbunches, each microbunch separated from adjacent microbunches by one wavelength of the emitted electromagnetic radiation 112. The microbunches, each positioned one wavelength from an adjacent microbunch, oscillate in phase with each other. As the intensity of the emitted electromagnetic radiation 112 increases further, the electrons are further clumped into microbunches with higher concentrations of electrons 102. The microbunches of electrons oscillating in phase with each other emit electromagnetic radiation 112 that is in phase, and allows for an overall increase, by many orders of magnitude, in the intensity of the emitted electromagnetic radiation 112.

One form of undulator, known as a superconducting undulator (SCU), employs superconducting magnets for generating the magnetic fields required for generating desired radiation. SCUs are more compact and are capable of higher current densities than other types of undulators. The superconducting magnets utilize high electrical currents through superconducting wire coils to generate high intensity magnetic fields. The large electrical currents, and the propagating charged particles, both emit high amounts of heat energy into the SCU device. Therefore, SCU radiation sources require cooling and heat control systems that are able to provide stable cooling and performance at temperatures of approximately 4 Kelvin (K). Typically, an SCU may be immersed in a helium bath which requires that magnets be directly immersed in the helium and requires substantial cooling powers. Further, other SCUs are cooled via convection cooling that utilizes cryocoolers and cryogenic plants which are bulky, require liquid helium or another coolant fluid, and are limited to providing 1.5 W of cooling to a minimum temperature of 4.2K.

Cooling systems that use a coolant fluid or cryogens require a liquid helium tank, fluid valves, and piping to ensure proper operation. Additionally, a series of safety valves and a burst disk is necessary to guarantee pressure vessel safety. As such, fluid based cooling systems for SCUs are typically bulky and require significant real estate, which does not take advantage of the smaller form factors of SCUs. Also, the minimum temperature for liquid helium systems is 4.2 K at a pressures slightly above atmosphere. Further, coolant fluids are expendable and are costly to be replaced, and an SCU suffers coolant fluid losses due to the transportation of the fluid for cold head maintenance cycles which involved removal of the fluid from the cooling system. Annual operation and maintenance of a fluid-based SCU coolant system is expensive due to fluid losses and the required upkeep of components of the coolant system. Further, while SCUs are able to operate at higher current densities than other undulators, fluid based cooling systems are unable to provide adequate cooling at the higher ACU current densities of, which limits the intensity of radiation generated by an SCU. The future performance of SCUs requires cooling systems that are less expensive, more compact, and are able to provide stable cooling at temperatures below 4 K to enable the next generation of radiation sources that provide higher output intensities.

SUMMARY OF THE DISCLOSURE

In an embodiment, disclosed is a conduction cooling apparatus having a beam chamber having a length along a longitudinal axis and a hollow core inside of the beam chamber along the length of the beam chamber, the beam chamber configured to allow charged particles to pass through the hollow core of the beam chamber along the length of the beam chamber and to generate output radiation. A beam chamber holder is physically coupled to the beam chamber to maintain the position of the beam chamber, the beam chamber holder being thermally coupled to the beam chamber. One or more magnets are physically configured to provide a magnetic field to the hollow core of the beam chamber, and one or more cooling bars are physically and thermally coupled to the one or more magnets. A magnet suspension beam physically is coupled to at least one of the one or more cooling bars, with the magnet suspension beam configured to maintain a position of the one or more magnets. A cooling source is thermally coupled to both the beam chamber holder and the one or more cooling bars, with the cooling source configured to provide cooling to the beam chamber holder and the one or more cooling bars.

In another embodiment, a conduction cooling apparatus includes a beam chamber having a hollow core and a length along a longitudinal axis, the beam chamber configured to allow charged particles to pass through the hollow core of the beam chamber along the length of the beam chamber. A beam chamber holder is physically coupled to the beam chamber to maintain the position of the beam chamber, with the beam chamber holder being thermally coupled to the beam chamber. The apparatus further includes a first magnet bundle including four magnets, each magnet of the first magnet bundle being physically coupled to another magnet of the first magnet bundle and each magnet of the first magnet bundle disposed around the beam chamber, with each magnet configured to provide a magnetic field to a first length of the hollow core along the longitudinal axis. A second magnet bundle has four magnets, each magnet of the second magnet bundle being physically coupled to another magnet of the second magnet bundle and each magnet of the second magnet bundle disposed around the beam chamber with each magnet of the second magnet bundle configure to provide a magnetic field to a second length of the hollow core along the longitudinal axis. The cooling apparatus also has a first set of four cooling bars, with each cooling bar of the first set of cooling bars thermally coupled to a respective magnet of the first magnet bundle, and each of the cooling bars of the first set of four cooling bars further thermally coupled to another cooling bar of the first set of cooling bars. The cooling assemble also includes a second set of four cooling bars, with each cooling bar of the second set of four cooling bars thermally coupled to a respective magnet of the second magnet bundle, and each of the cooling bars of the second set of four cooling bars further thermally coupled to another cooling bar of the second set of four cooling bars. A first magnet suspension beam is physically coupled to a cooling bar of the first set of four cooling bars to support the position of the first set of four cooling bars and the first magnet bundle, and a second magnet suspension beam is physically coupled to a cooling bar of the second set of four cooling bars to support the position of the second set of four cooling bars and the second magnet bundle. A first cooling source is thermally coupled to the beam chamber holder and a cooling bar of the first set of four cooling bars, and the first cooling source is configured to provide cooling capacity to the beam chamber holder and to the first set of four cooling bars. A second cooling source is thermally coupled to the beam chamber holder and a cooling bar of the second set of four cooling bars, and the second cooling source is configured to provide cooling capacity to the beam chamber holder and the second set of four cooling bars.

In yet another embodiment, a conduction cooling apparatus includes a beam chamber having a hollow core and a length along a longitudinal axis, the beam chamber configured to allow charged particles to pass through the hollow core of the beam chamber along the length of the beam chamber. A beam chamber holder is physically coupled to the beam chamber to maintain the position of the beam chamber, the beam chamber holder being thermally coupled to the beam chamber. The cooling apparatus includes a first magnet section having four magnets, each magnet of the first magnet section disposed around the beam chamber with each magnet of the first magnet section configured to provide a magnetic field to a first length of the hollow core along the longitudinal axis, and a second magnet section including four magnets, each magnet of the second magnet section disposed around the beam chamber with each magnet of the second magnet section configured to provide a magnetic field to a second length of the hollow core along the longitudinal axis. The cooling apparatus further includes a first set of cooling plates, with each cooling plate of the first set of cooling plates being thermally coupled to a respective magnet of the first magnet section, and a second set of cooling plates, with each cooling plate of the second set of cooling plates being thermally coupled to a respective magnet of the second magnet section. A first set of magnet support ribs are physically coupled to the first set of cooling plates the first magnet support ribs configured to maintain the position of the first magnet section, and with each rib of the first set of magnet support ribs physically coupled to adjacent cooling plates of the first set of cooling plates. A second set of magnet support ribs are physically coupled to the second set of cooling plates the second magnet support rib configured to maintain the position of the second magnet section, and with each rib of the second set of magnet support ribs physically coupled to adjacent cooling plates of the second set of cooling plates. The apparatus has a plurality of cooling fins, with each cooling fin of the plurality of cooling fins having a first end and a second end. The first end of each cooling fin of the plurality of cooling fins is thermally coupled to the beam chamber, and the second end of each of the cooling fins of the plurality of cooling fins is thermally coupled to the beam chamber holder. Further, each cooling fin of the plurality of cooling fins is disposed between adjacent ribs of the first and second sets of magnet support ribs. A first cooling source is thermally coupled to the beam chamber holder and a cooling plate of the first set of cooling plates. The first cooling source is configured to provide cooling capacity to the beam chamber holder and the first set of cooling plates. The apparatus also includes a second cooling source thermally coupled to the beam chamber holder and a cooling plate of the second set of cooling plates. The second cooling source is configured to provide cooling capacity to the beam chamber holder and the second set of cooling plates.

BRIEF DESCRIPTION OF THE DRAWINGS

FIG. 4 is a table of the heat load distribution to a 40 K first cooling stage of the conducting cooling apparatus of FIG. 2.

FIG. 6 is a table of heat load distribution of a 4 K second cooling stage of a constructed conductive cooling apparatus and SCAPE undulator.

DETAILED DESCRIPTION

Superconducting-magnet based undulators outperform undulators that use permanent magnets or room-temperature electromagnets in terms of peak magnetic field and, therefore, in the energy range and intensity of emitted radiation. To take advantage of the benefits of superconducting undulators (SCUs), cooling systems are required to provide stable temperature control of SCUs at temperatures at or below 4 K. The cooling system disclosed utilizes conductive cooling which removes the requirement for a coolant fluid or cryogen, such as liquid helium, and enables stable thermal control of an SCU at temperatures below 4 K while outputting greater than 1 Watt of radiation. Specifically, as discussed further herein, the disclosed system enables between 1.2 and 1.5 W of radiative output during operation while maintaining stable temperature control at 4 K and below. The described cooling system also reduces the overall operating costs and form factor sizes of SCU radiation systems.

Figure 1:
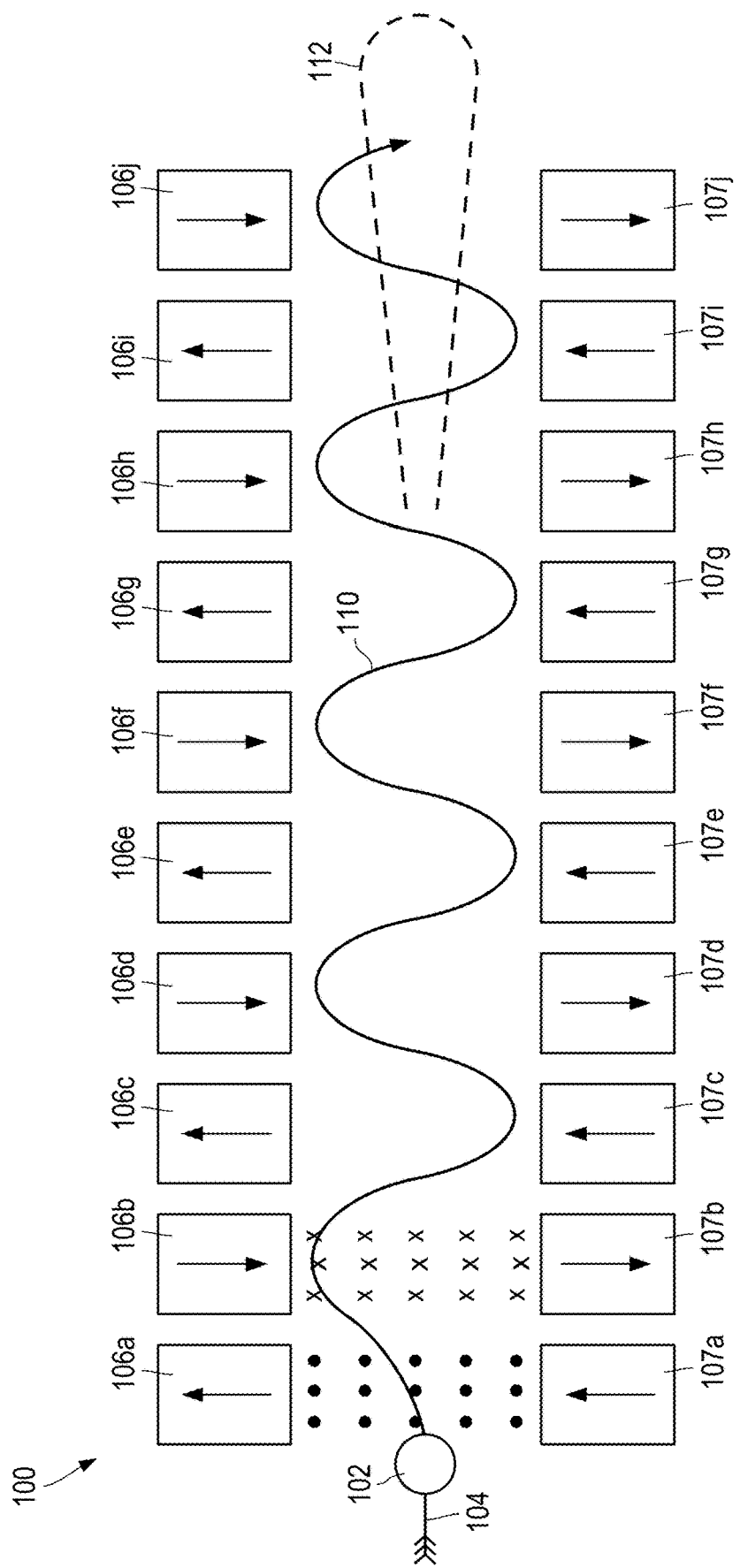
FIG. 1 illustrates a typical embodiment of an undulator configuration and an electron trajectory through the undulator.
Figure 2:
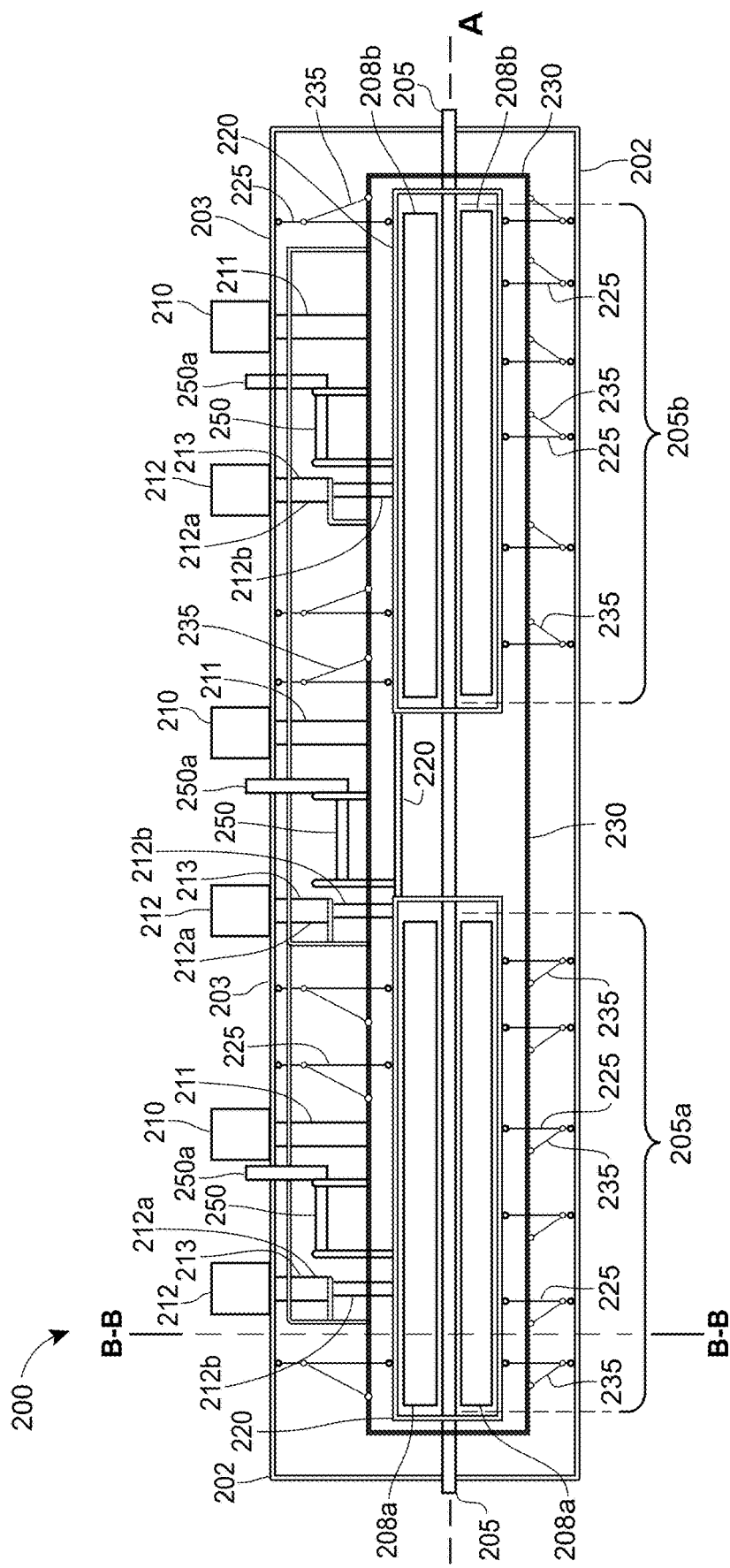
FIG. 2 is a cross-sectional side view of a block diagram of a conduction cooling apparatus for a superconducting undulator (SCU) device.

FIG. 2 is a cross-sectional side view block diagram of a conduction cooling apparatus 200 for a superconducting undulator device. The cooling apparatus 200 includes a cryostat vacuum vessel 202, a beam chamber 205, a beam chamber holder 230, first and second magnet bundles 208*a* and 208*b*, and a plurality of one-stage and two-stage coldheads 210 and 212. Each of the one-stage and two-stage coldheads 210 and 212 perform as cooling sources that are thermally coupled to at least one of the first and second magnet bundles 208*a* and 208*b* by cooling bars 220, or to the beam chamber holder 230, discussed in detail further herein. The beam chamber 205 is a hollow structure such as a hollow metallic cylinder or a hollow electrically inert elongated structure configured to allow for a beam of charged particles to pass through a center hollow region of the beam chamber 205 along a longitudinal axis of the beam chamber 205, referred to herein as the beam axis A. The first magnet bundle 208*a* is disposed adjacent to a first beam chamber portion 205*a* along the length of the beam chamber 205 to provide a magnetic field to a beam of charged particles that may pass through the hollow region of the first beam chamber portion 205*a*, and the second magnet bundle 208*b* is disposed adjacent to a second beam chamber portion 205*b* along the length of the beam chamber 205 to provide a magnetic field to a beam of charged particles passing through the hollow region of the second beam chamber portion 205*b*. The first and second magnet bundles 208*a* and 208*b* include a plurality of superconducting magnets that include a magnet core and a superconducting wire coil configured to conduct high electrical currents to provide large magnetic fields to a beam of charged particles passing through the beam chamber 205. In embodiments, the length of the beam chamber 205 along the beam axis may be 0.1 to 1 meters, 1 to 2 meters, 2 to 5 meters, or longer than 4 meters. Additionally, each of the magnet bundles 208*a* and 208*b* may independently include superconducting magnets that have a length along the beam axis of 0.5 to 1 meter, 1 to 2 meters, or longer than 1.5 meters.

The vacuum vessel 202 and beam chamber holder 230 perform as a thermal radiation shield eliminating the need for any additional thermal shielding as required by other undulator cooling systems. The beam chamber holder 230 insulates the magnet bundles 208a and 208b and beam chamber 205 from any room temperature or external boundary at the vacuum vessel 202. The vacuum vessel 202 is an enclosed structure that contains the beam chamber 205, the first and second magnet bundles 208a and 208b, interconnecting structural supports, and thermal interconnects, discussed further herein. The vacuum vessel 202 also acts as a mount for the coldheads 210 and 212 to physically support the one-stage and two-stage coldheads 210 and 212 in position. One or more turrets may be implemented to mount the one-stage and two-stage coldheads 210 and 212 on the vacuum chamber 202. The one-stage and two-stage coldheads 210 and 212 may be mounted on an external surface 203 of the vacuum vessel 202. Each of the one-stage and two-stage coldheads 210 and 212 has a corresponding one stage or two-stage coldhead cylinder 211 and 213. The two-stage coldhead cylinders 213 have a first stage 212a and a second stage 212b that provide different cooling capacities. The vacuum vessel 202 has ports or entry regions for the one-stage and two-stage coldhead cylinders 211 and 213 to enter the vacuum vessel 202 through the external surface 203, for the one-stage and two-stage coldhead cylinders 211 and 213 to protrude into the vacuum vessel. In embodiments, the vacuum vessel may be fabricated from one or more of titanium, stainless steel, carbon steel, or an aluminum alloy.

The cooling bars 220 include a series of thermally coupled cooling bars that are thermally coupled to second stages 212b of the two-stage coldheads 212. The cooling bars 220 are also thermally coupled to the first and second magnet bundles 208a and 208b. Therefore, the cooling bars 220 enable thermal control of the first and second magnet bundles 208a and 208b by drawing heat energy from the first and second magnet bundles 208a and 208b to the coldheads 212 through the coldhead cylinders 213. In embodiments the cooling bars 220 may be an oxygen free copper, CU10100, another copper material, an AI1000 material, or another aluminum material. The cooling bars 220 are physically coupled to the vacuum vessel 202 by magnet suspension rods 225. The magnet suspension rods 225 suspend the cooling bars 220 in a fixed position inside of the vacuum vessel 202. In embodiments, the magnet suspension rods 225 may be beams, plates, cylinders, or another structural component to support the position of the cooling bars 220 and magnet bundles 208a and 208b. Further, the cooling bars 220 are physically coupled to the first and second magnet bundles 208a and 208b to provide physical support and to maintain a fixed position of the first and second magnet bundles 208a and 208b within the vacuum chamber 202 and around the beam chamber 205. In embodiments, the magnet suspension rods 225 may be titanium, which has a low thermal conductivity. The low thermal conductivity of the titanium reduces the flow of thermal energy through the magnet suspension rods 225, enabling increased thermal control and cooling capacity of an undulator device. In the illustration of FIG. 2, the undulator device may be considered to include the beam chamber 205 and the first and second magnet bundles 208a and 208b. Other elements illustrated in the apparatus 200 of FIG. 2 may be considered to be additional elements to facilitate the operation of the undulator device such as providing a vacuum, thermal control, mounting and positioning of the undulator device, etc. In embodiments, the magnet suspension rods 225 may be another material, other than titanium, having low thermal conductivity such as Kevlar 49, another Kevlar, G-10, a G-10 material, or another material that exhibits a thermal conductivity of less than 1 W/(m*K) between 40K and 4K.

Beam chamber suspension rods 235 are physically coupled to the magnet suspension rods 225 and to the beam chamber holder 230 to support and maintain a position of the beam chamber holder 230. The beam chamber holder 230 is further physically coupled to the beam chamber 205 to suspend the beam chamber 205 in a fixed position inside of each of the first and second magnet bundles 208a and 208b. The beam chamber holder 230 is also thermally coupled to the beam chamber 205 to provide cooling capacity to the beam chamber 205. The beam chamber suspension rods 235 may be a low thermally conductive material such as titanium, Kevlar 49, another Kevlar material, G-10, a G-10 material, or another material that exhibits a thermal conductivity of less than 1 W/(m*K) between 40K and 4K. It may be desirable for the beam chamber suspension rods 235 to have a low thermal conductivity to reduce the flow of thermal energy through the beam chamber suspension rods 235 to provide an increased cooling capacity to the undulator device. The beam chamber holder 230 is thermally coupled to the one-stage coldhead cylinders 211. The one-stage coldhead cylinders 211 provide a heat sink to the beam chamber holder 230, and the beam chamber holder 230 provides cooling capacity to the beam chamber 205.

The conduction cooling apparatus 200 also includes high temperature superconducting (HTS) electrical leads 250a to provide an electrical current to components inside of the vacuum chamber 202. Specifically, the HTS leads 250a provide power to the first and second magnet bundles 208a and 208b to supply electrical current to superconducting wires of the first and second magnet bundles 208a and 208b. Copper leads 250 are configured to provide electrical current to components inside of the vacuum chamber and to balance a conduction heat load and joule heating during operation of the superconducting undulator device.

Figure 3:
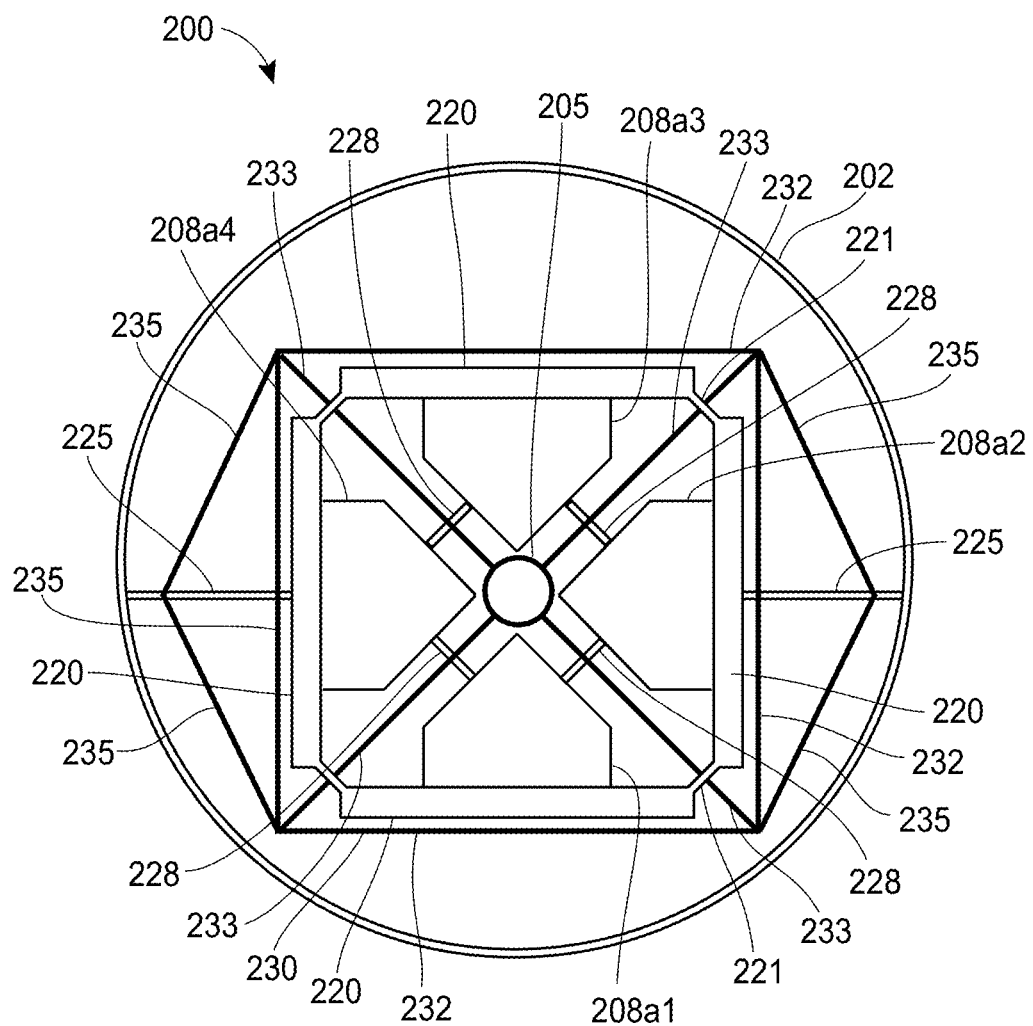
FIG. 3 is a cross-sectional view of an embodiment of the conduction cooling apparatus taken along B-B as depicted in FIG. 2.

FIG. 3 is a cross-sectional view of a first embodiment of the conduction cooling apparatus 200 taken along B-B as depicted in of FIG. 2. While FIG. 3 is described as a cross-section along the first beam chamber portion 205a at B-B, the cross-section of FIG. 3 is also representative of a cross-section taken along the second beam chamber portion 205b. It should be understood that the elements, geometries of the elements, physical and thermal coupling of the elements, and physical positions of the elements described in reference to FIG. 3 also apply to the second beam chamber portion 205b. FIG. 3 illustrates the vacuum vessel 202 and magnet suspension rods 225 physically coupled to both the vacuum vessel 202 and the cooling bars 220. While illustrated as only two magnet suspension rods 225, in embodiments, one, three, four, five, or more magnet suspension rods 225 may be physically coupled to the cooling bars 220 and the vacuum vessel 202 to support and maintain a physical position of the cooling bars 220. The magnet suspension rods 225 may be titanium, Kevlar 49, another Kevlar, G-10, a G-10 material, or another material that exhibits a thermal conductivity of less than 1 W/(m*K) between 40K and 4K. The cooling bars 220 are physically and thermally coupled to each other by cooling bar couplers 221 to further support a rigid structure of, and to allow thermal energy to flow between, the cooling bars 220. The cooling bars 220 are also physically and thermally coupled to magnets $208a_1$, $208a_2$, $208a_3$, and $208a_4$ to position the magnets 208a, through $208a_4$ around the beam chamber 205. The magnets $208a_1$, $208a_2$, $208a_3$, and $208a_4$ are each physically coupled to an adjacent magnet of the magnets $208a_1$, $208a_2$, $208a_3$, and $208a_4$ by intra-magnet suspensions 228. Together, the magnets $208a_1$, through $208a_4$ form the first magnet bundle 208a, and may, as a group, be referred to as the first magnet bundle 208a for simplicity. The intra-magnet suspensions 228 physically couple adjacent magnets of the first magnet bundle 208a to further support a rigid structure and to maintain relative positions of the magnets 208a, through 208a4 relative to the beam chamber 205. For example, one intra-magnet suspension 228 is physically coupled between the bottom magnet $208a_1$, of FIG. 3, and the right magnet $208A_2$ of FIG. 3. The intra-magnet suspensions 228 provide structural support to maintain a relative distance between the magnets of the first magnet bundle 208, and to further support maintaining the positions of all of the magnets of the first magnet bundle 208 in relation to the beam chamber 205. The intra-magnet suspensions 228 may be a rod, a bar, a plate, a beam, or another structure for coupling together adjacent magnets. The intra-magnet suspensions 228 may include one or more of titanium, stainless steel, copper, aluminum, or another rigid material to provide structural support to the magnets of the first magnet bundle 208. The intra-magnet suspensions 228 may be a thermally conductive material, or a non-thermally conductive material.

The beam chamber suspension rods 235 are physically coupled to the magnet suspension rods 225 and to the beam chamber holder 230 to physically support and maintain a position of the beam chamber holder 230. The beam chamber holder 230 has an outer frame 232 and cross bars 233. The cross bars 233 extend from the outer frame 232 and are physically coupled to the beam chamber 205 to suspend the beam chamber 205 in a fixed position inside of the first magnet bundle 208a. In embodiments, multiple cross bars 233 are interleaved in between multiple intra-magnet suspensions 228 and cooling bar couplers 221 in a dimension along the length of the beam chamber 205 (i.e., along the beam axis A illustrated in FIG. 2). The outer frame 232 of the beam chamber holder 230 may be a solid material that extends around all sides of the cooling bars 220 with slots or holes to allow the magnet suspension rods 225 to pass through the outer frame 232. Further, the outer frame 232 may be a solid material that extends along the length of the beam chamber, as illustrated in FIG. 2, with various ports or openings for elements to pass through the outer frame 232 such as cooling bars 220, second stages 212b of the two-stage coldheads 212, and the beam chamber 205. The outer frame 232 and the cross bars 233 may be copper 232, copper 233, copper 205, Cu10100, an oxygen free copper, another copper material, an AL1000 material, another aluminum, or another material having a thermal conductivity of greater than 1050 W/(m*K) at between 35K and 45K.

A superconducting arbitrarily polarizing emitter (SCAPE) undulator was constructed and a conductive cooling apparatus was built according to FIGS. 2 and 3 to cool the SCAPE undulator. The SCAPE was built having two magnet bundles as illustrated in FIG. 2 with lengths along the beam axis A of 0.5 meters for each of the first and second magnet bundles 208a and 208b. The constructed SCAPE required 170 W of cooling capacity to function properly. The embodiment of the conductive cooling apparatus described below provided 182 W of cooling capacity to the SCAPE undulator, providing a margin of 12 W of cooling capacity for proper functionality of the SCAPE undulator.

The SCAPE undulator and constructed conductive cooling apparatus will be described in reference to FIG. 2 for clarity. The beam chamber 205, beam chamber holder 230, and magnet bundles 208a and 208b were thermally coupled to the three one-stage coldheads 210 (Sumitomo RDK-500B) and the three two-stage coldheads 212 (Sumitomo RDE-418D4). The beam chamber 205 was 4.4 m long and made of copper. Thermal straps made of Cu10100 (RRR=50 or greater) were used to thermally couple the one-stage coldheads 210 and the first stage 212a of the two-stage coldhead cylinders 212 to the beam chamber holder 230. The use of thermal straps also isolates any vibrations of the one- and two-stage coldheads 210 and 212, and the vacuum chamber 202 from effecting the beam chamber 205 during operation. The beam chamber 205 and beam chamber holder 230 were thermally controlled by the one-stage coldheads 210 through the one-stage coldhead cylinders 211 and the first stage 212a of the two-stage coldhead cylinders 212. The cooling of the beam chamber 205 and beam chamber holder 230 is further referred to herein as the first cooling stage of the undulator, which was a 40 K cooling stage. The temperature range for the beam chamber 205 and the beam chamber holder 230, during operation of the SCAPE undulator, was between 33.8 K and 37.8 K, with an average operating temperature of 35.0 K. FIG. 4 is a table of the heat load distribution to the first cooling stage of the undulator. The beam chamber 205 had an estimated head load of 182 W and the total heat load to the first stage was 437.5 W. The cooling apparatus' described herein may operate with independent first and second stage heat loads of between 300 and 400 W, or 400 W or greater.

Figure 5:
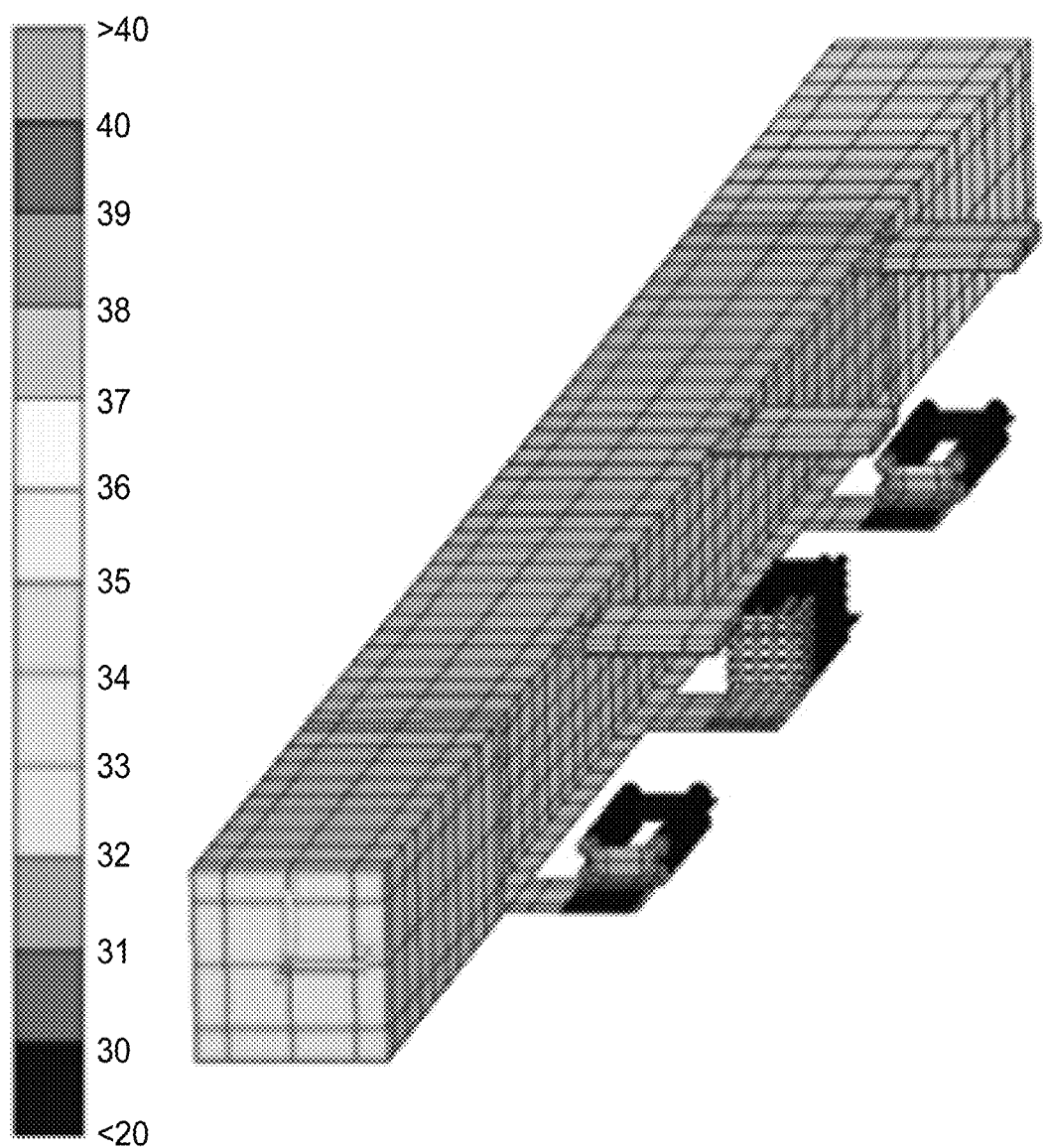
FIG. 5 is a contour plot of a simulated temperature distribution of a beam chamber holder of a constructed conductive cooling apparatus and a superconducting arbitrary polarizing emitter (SCAPE) undulator.

Other main sources of heat reported in the table of FIG. 4 include heat due to main current leads that provide current to each magnet of the first and second magnet bundles 208a and 208b, conduction heat of correction current leads of correction magnets at each end of each magnet of the first and second magnet bundles 208a and 208b, conduction current through a center kicker magnet lead, heat due to an electron beam passing through the beam chamber 205, and joule heat due to the main current leads, correction leads, and kicker magnet leads. The kicker magnets, not illustrated, are dipole magnets disposed along the beam path A configured to rapidly switch the trajectory of a particle beam from one path to another path. FIG. 5 is a contour plot of simulated temperature distribution of the beam chamber holder 230 and SCAPE undulator. The plot of FIG. 5 shows the overall temperature range of the conduction cooling apparatus 200 to be between 33.8 K and 37.8 K, with an average temperature of 35.0 K.

Figure 7:
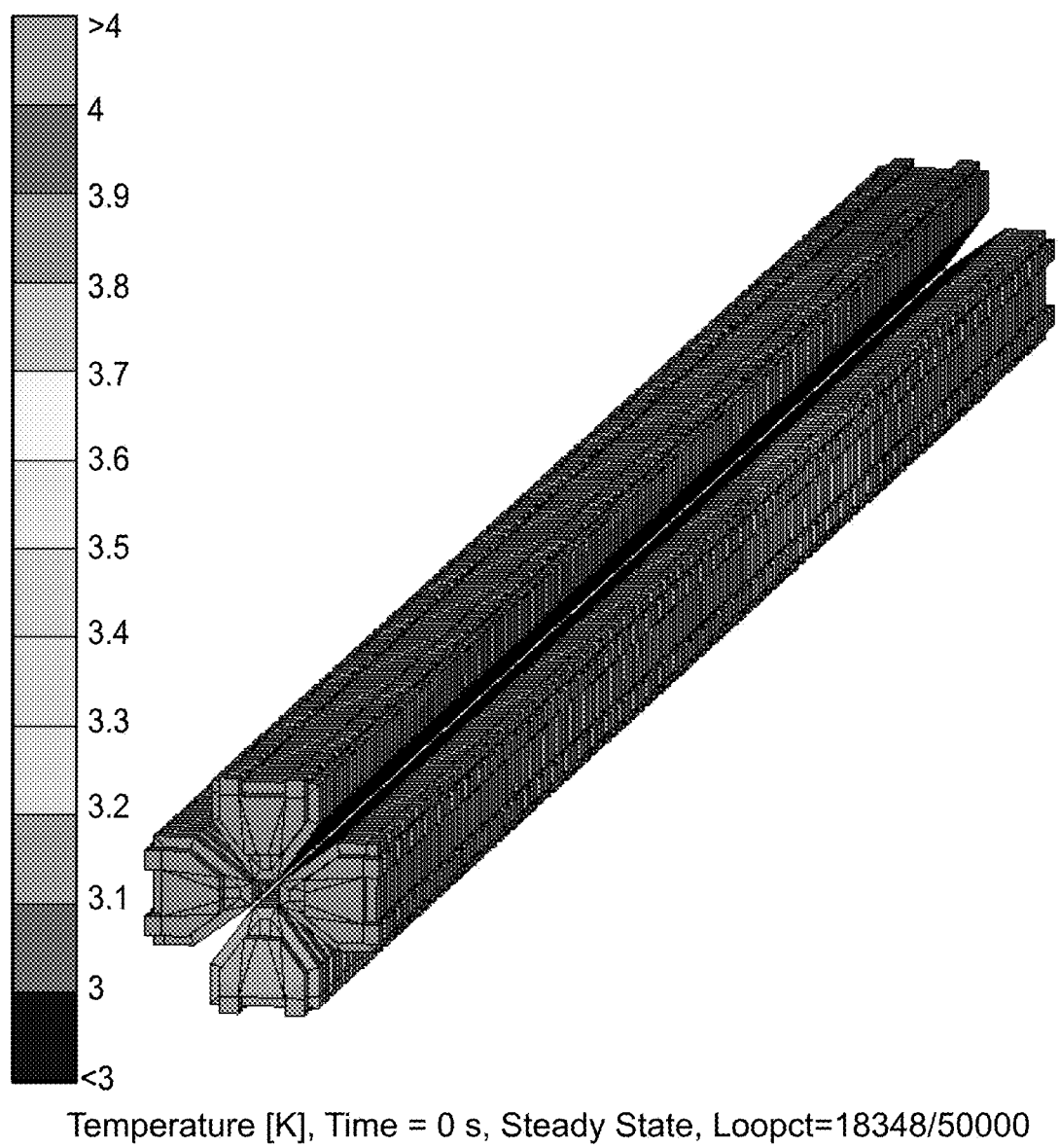
FIG. 7 is a contour plot of a simulated temperature distribution of a magnet bundle of a constructed conductive cooling apparatus and SCAPE undulator.

The second stages 212b of the two-stage coldhead cylinders 213 provide cooling capacity to the cooling bars 220 and the magnets of the first and second magnet bundles 208a and 208b. The cooling of the first and second magnet bundles 208a and 208bv and the cooling bars 220 are referred to herein as the second cooling stage of the undulator, or the magnet cooling. The second cooling stage provided thermal control and cooling of a heat load at 4K. FIG. 6 is a table of the heat load distribution of the second cooling stage. Magnet heating due to radiation penetrating though the beam chamber 205 was 1.3 W, which was the largest contributor to the heat load of the second cooling stage. Other heat load contributions include 0.46 W from conduction heat through HTS electrical leads, 0.2 W due to thermal energy from the beam chamber 205 and beam chamber holder 230, and a heat margin of 0.5 W was added to compensate for unexpected heat load due to manufacturing errors or incongruities. The total heat load of the second cooling stage was 2.5 W. FIG. 7 is a contour plot of simulated temperature distribution of a magnet bundle of the constructed conductive cooling apparatus and SCAPE undulator. The plot of FIG. 7 illustrates the overall temperature range of superconducting wire coils of the magnet bundle to be between 3.49 K and 3.98 K, with an average temperature of 3.76 K. The magnets of the magnet bundle had a temperature range of 3.49 K to 3.96 K, with an average temperature of 3.76 K. The constructed conductive cooling apparatus described above enabled stable thermal control of the beam chamber 205 and beam chamber holder 230 at less than 40 K, and the magnet bundles 208a and 208b at less than 4 K.

Figure 8:
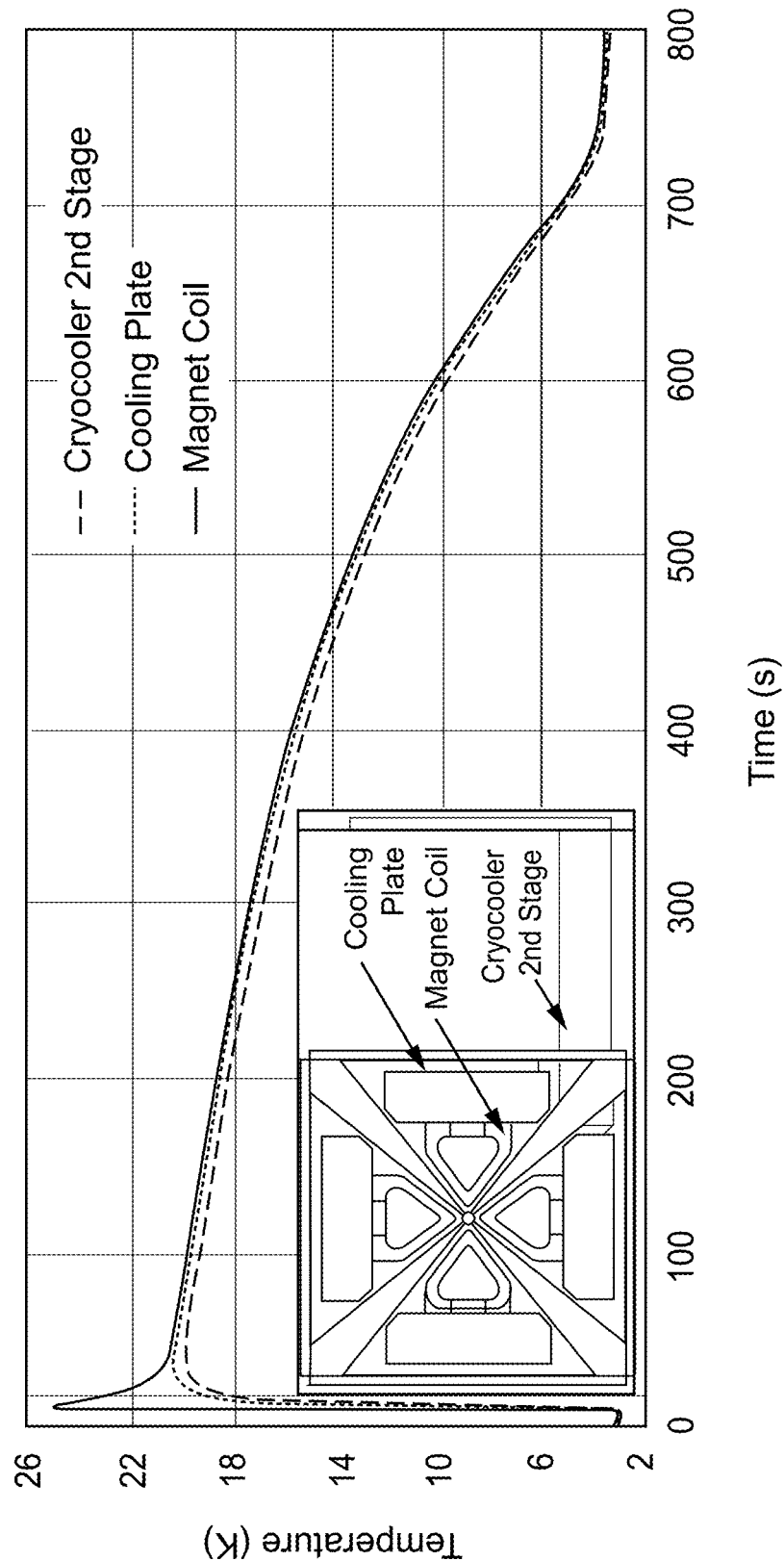
FIG. 8 is a plot of temperature versus time for a simulated magnet quench of the SCU device and conductive cooling apparatus of FIG. 2.

FIG. 8 is a plot of temperature versus time for a simulated magnet quench of the SCU device and conductive cooling apparatus 200 of FIG. 2. FIG. 8 shows the temperature of superconducting magnet wires (i.e., magnet coil) of the magnet bundles 208a and 208b, the cooling bars 220 (i.e., cooling plate), and a cryocooler second cooling stage (i.e., crycooler $2^{nd}$ stage) that provides cooling capacity to the magnet bundles 208a and 208b of the conductive cooling apparatus 200. A total of 25000 of heat energy was provided to the superconducting magnet wires within 1 second to simulate the magnet quench. The maximum temperature reached by the coil was 25.05 K. The amount of recovery time for the coil to cool back to 4 K was 722 seconds.

Figure 9:
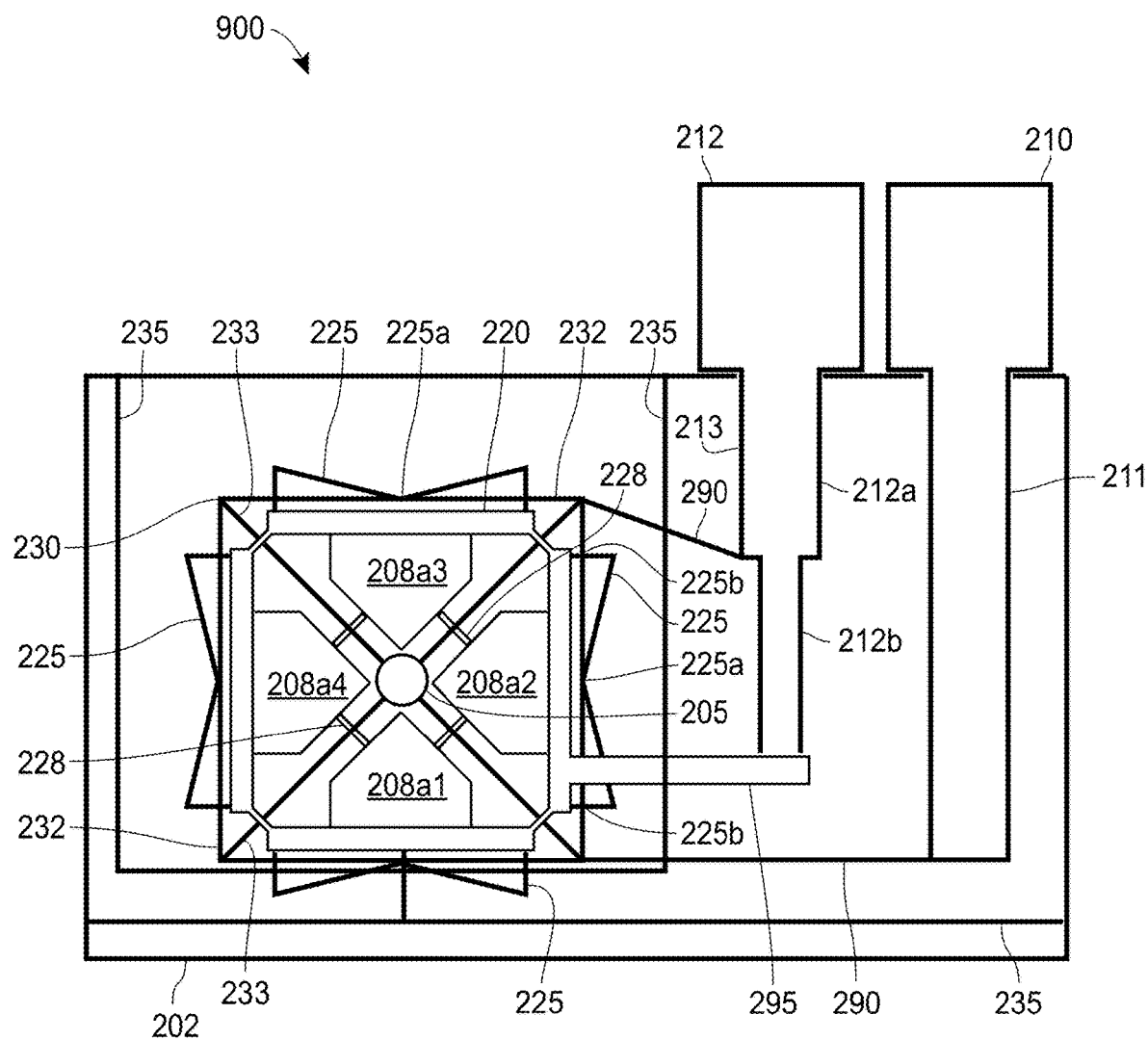
FIG. 9 is an axial cross-sectional view of a second embodiment of the conduction cooling apparatus taken along B-B as depicted in FIG. 2.

FIG. 9 is an axial cross-sectional view of a second embodiment 900 of the conduction cooling apparatus 200 taken along B-B as depicted in FIG. 2. While FIG. 9 is described as a cross-section along the first beam chamber portion 205a at B-B, the cross-section of FIG. 9 is also representative of a cross-section taken along the second beam chamber portion 205b. The embodiment 900 of FIG. 9 includes the vacuum vessel 202 and beam chamber suspension rods 235 physically coupled to the vacuum vessel 202. The beam chamber suspension rods and physically coupled to the cooling bars 220 and the beam chamber holder 230 to maintain a position of the cooling bars 220 and the beam chamber holder 230 within the vacuum vessel 202. The beam chamber holder 230 includes the outer frame 232 and cross bars 233 with the cross bars 233 physically coupled to the beam chamber 205 to maintain a position of the beam chamber 205 relative to the magnets $208a_1$, through $208a_4$ of the first magnet bundle 208. Each of the physical connections of the beam chamber holder 230, outer frame 232, beam chamber suspension rods 235, and beam chamber 205 may be soldered, fused, welded, brazed, or otherwise thermally and physically coupled. In embodiments, each magnet of the first magnet bundle 208, cooling bars 220, and intra-magnet suspensions 228 may be soldered, fused, welded, brazed, or each may independently be physically and thermally coupled via a bolt, screw, vice, or by another physical coupling.

Magnet suspension rods 225 are coupled to the outer frame 232 of the beam chamber holder 230 at an apex point 225a, and further physically coupled to the cooling bars 220 at endpoints 225b to support and maintain the physically position of the cooling bars 220. The cooling bars 220 are physically and thermally coupled to the magnets $208a_1$, through $208a_4$ of the first magnet bundle 208a to provide cooling capacity to the magnets $208a_1$, through $208a_4$ and to maintain a position of the first magnet bundles 208a around the beam chamber 205. The intra-magnet suspensions 228 physically couple adjacent magnets of the first magnet bundle 208a to maintain the rigid structure and relative positions of the magnets $208a_1$, through $208a_4$ relative to the beam chamber 205. The intra-magnet suspensions 228 may be interleaved with the cross bars 233 of the beam chamber holder 230 along the length of the first beam chamber portion 205a.

FIG. 9 further illustrates the one- and two-stage coldheads 210 and 212 and the one- and two-stage coldhead cylinders 211 and 213. The one-stage coldhead cylinder 211, and the first stage 212a of the two-stage coldhead cylinder 213 is thermally coupled to the beam chamber holder 230 to provide cooling capacity to the beam chamber holder 230, and ultimately, to the beam chamber 205. The stages of the one-stage and two-stage coldhead cylinders 211 and 212 may be thermally coupled to the cooling bars 220 and the beam chamber holder 230 by first stage and second stage thermal straps 290 and 295. The first stage thermal straps 290 are thermally coupled to the one-stage coldhead 210, the first stage 212a of the two-stage coldhead cylinder 212, and the beam chamber holder 230. The second stage thermal straps 295 are thermally coupled to the second stage 212b of the two-stage coldhead cylinder 212 and at least one cooling bar 220. The first stage and second stage thermal straps 290 and 295 may be copper 232, copper 233, copper 205, Cu10100, an oxygen free copper, another copper material, an AL1000 material, another aluminum.

Figure 10A:
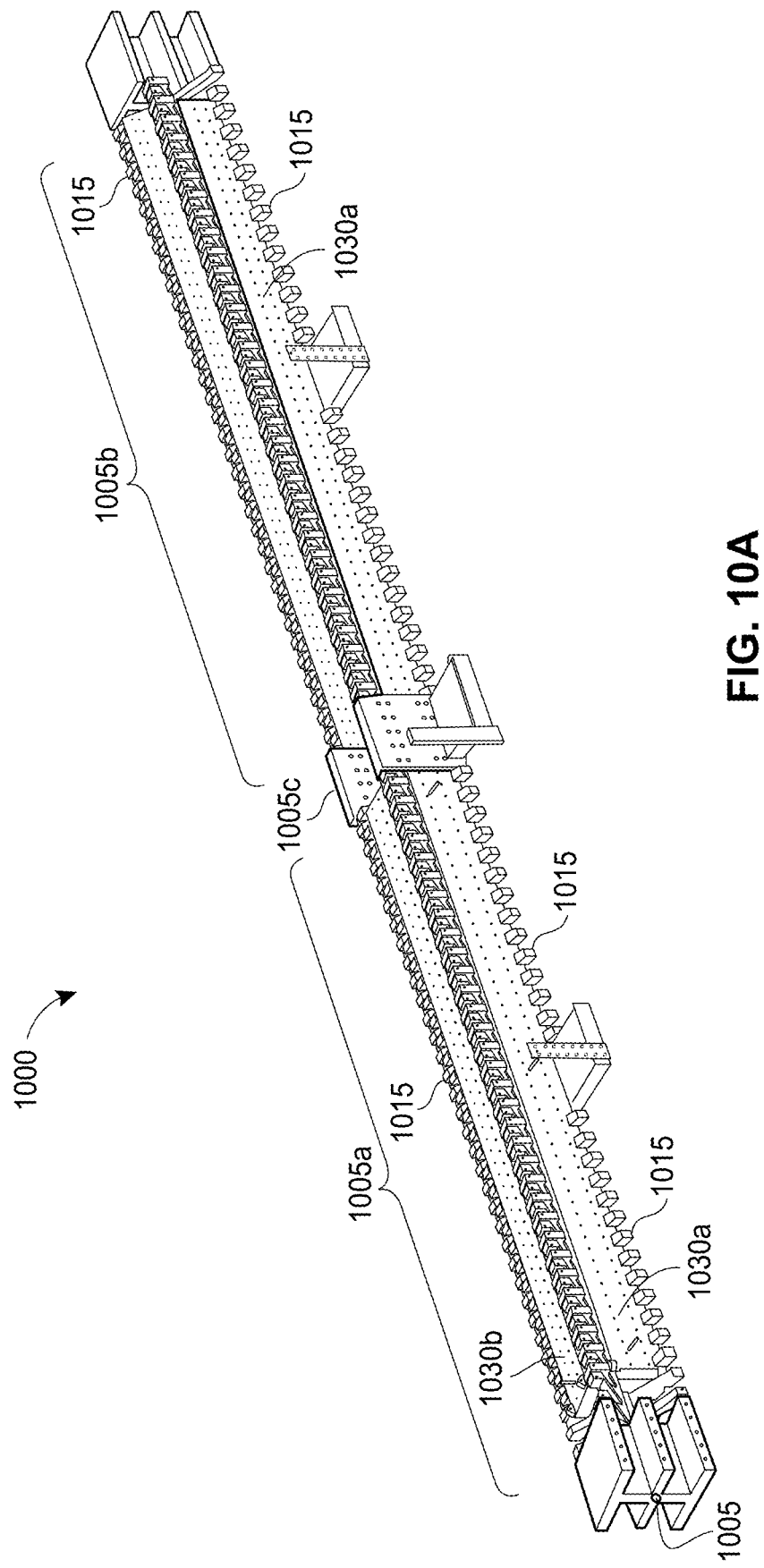
FIG. 10A is a perspective view of an embodiment of a conductively cooled SCU device having beam chamber cooling fins and magnet support plates.
Figure 10B:
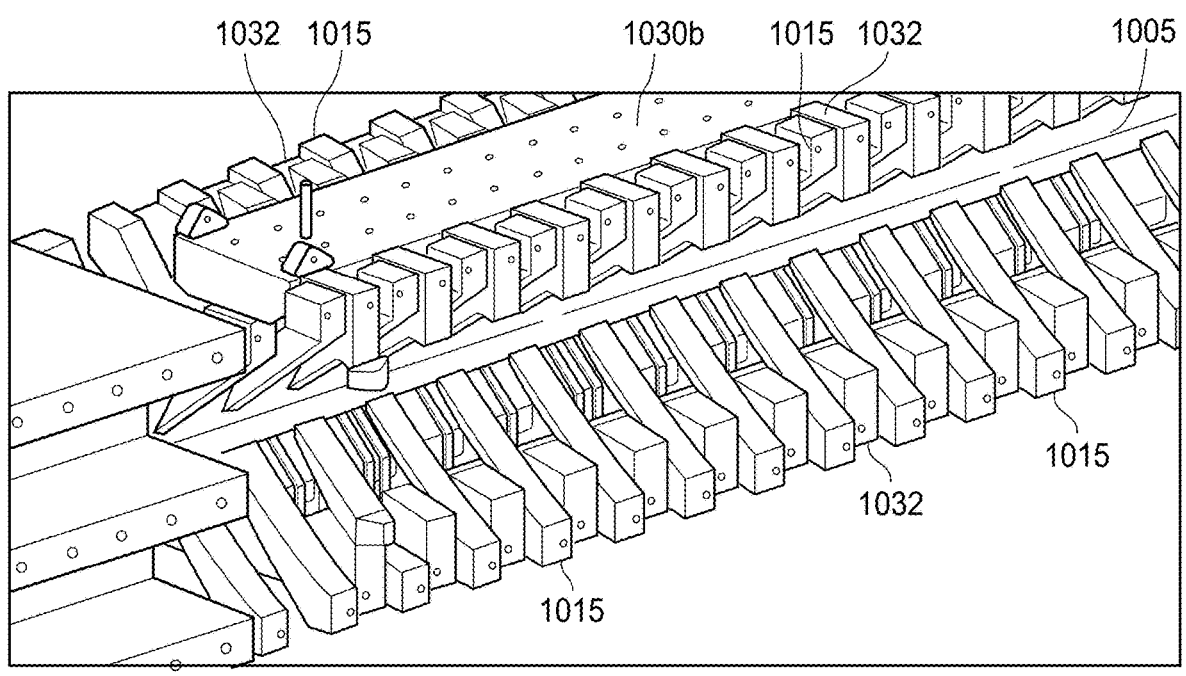
FIG. 10B is an image of an enlarged section of a first beam chamber portion of the conductively cooled SCU device of FIG. 10A.
Figure 10C:
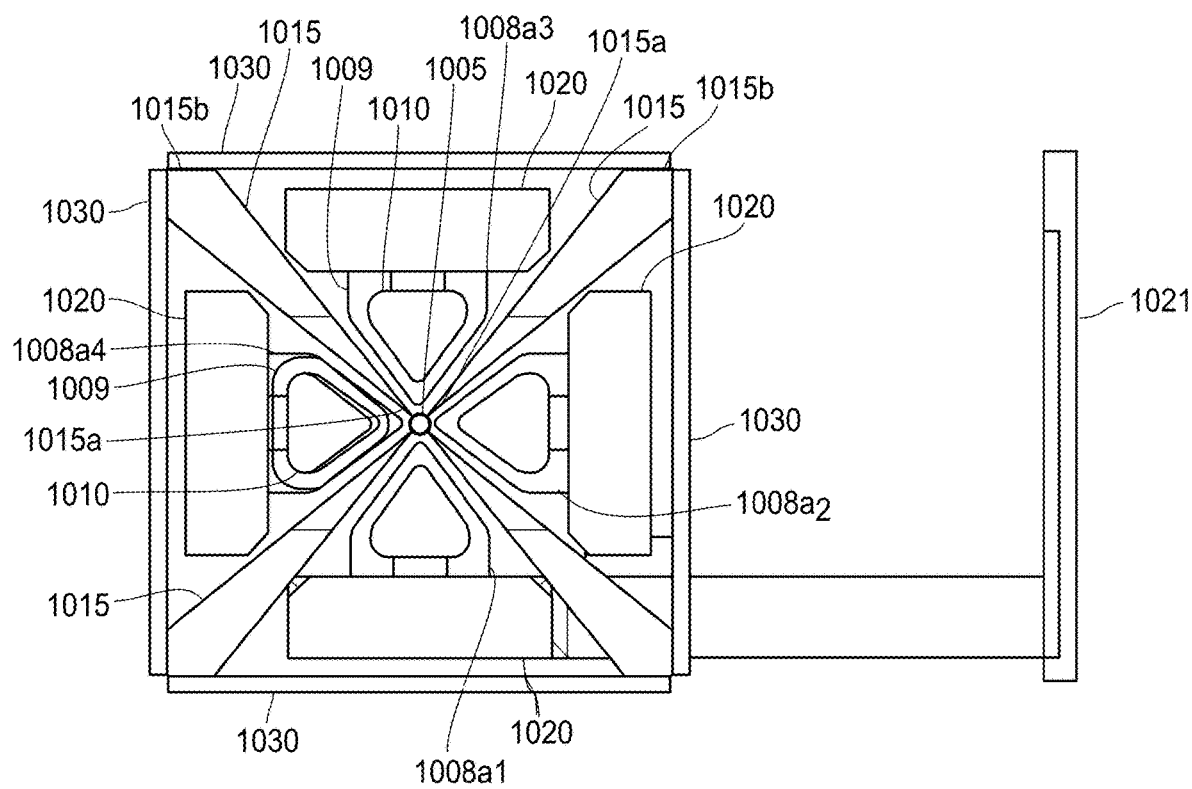
FIG. 10C is a cross-sectional view of the SCU device of FIG. 10A along a section of either a first beam chamber portion or a second beam chamber portion.

FIG. 10A is a perspective view of an embodiment of a conductively cooled SCU device 1000 having beam chamber cooling fins 1015 that providing cooling capacity to a beam chamber 1005 of the conductively cooled SCU device 1000 of FIG. 10A. The conductively cooled SCU device 1000 has a first beam chamber portion 1005a, a second beam chamber portion 1005b, and a beam chamber mid-section 1005c. The first beam chamber portion 1005a has a first magnet bundle 1008a and the second beam chamber portion 1005b has a second magnet bundle 1008b. The beam chamber mid-section 1005C include kick magnets for beam steering or beam trajectory correction. The conductively cooled SCU device 1000 includes a side cooling plate support 1030a and a top cooling plate support 1030b that are physically and thermally coupled to cooling plates to provide cooling capacity to magnets of the SCU device 1000. In embodiments, the SCU device 1000 also includes back and bottom cooling plate supports not illustrated in FIG. 10A. FIG. 10B is an enlarged image of a section of the first beam chamber portion 1005a with the side cooling plate support 1030a removed to provide a view of the beam chamber 1005 and the cooling fins 1015. FIG. 10O is a cross-sectional view of the SCU device 1000 along a section of either the first beam chamber portion 1005a or the second beam chamber portion 1005b. For clarity and simplicity, FIG. 10O will be described in reference to the first beam chamber portion 1005a. Referring simultaneously to FIGS. 10A-10C, the beam chamber cooling fins 1015 are thermally coupled to the beam chamber 1005, at a first end 1015a of the cooling fins 1015, to provide cooling capacity to the beam chamber 1005. Further, the beam chamber cooling fins 1015 are thermally coupled to a beam chamber holder 1030 at a second end 1015b of the cooling fins 1015. The beam chamber 1005 is thermally and physically coupled to the beam chamber holder 1030 through the beam chamber cooling fins 1015. As illustrated in FIG. 10O, the cooling fins 1015 are deltoid shaped planar structures that extend diagonally away from the beam chamber 1005. The tapered design of the deltoid shaped cooling fins 1015 allows for a more compact design, and higher magnetic field to be provided to the beam chamber 1005.

As shown in FIG. 10O, the cooling plates 1020 are physically and thermally coupled to the beam chamber holder 1030. The cooling plates 1020 are further physically and thermally coupled to four magnets $1008a_1$, $1008a_2$, $1008a_3$, and $1008a_4$ to provide support for a physical position of the magnets $1008a_1$, $1008a_2$, $1008a_3$, and $1008a_4$ relative to the beam chamber 1005. Each magnet of the magnets $1008a_1$, $1008a_2$, $1008a_3$, and $1008a_4$ has a magnet coil 1009 wrapped around a magnet core 1010. The magnet coils 1009 are configured to conduct an electrical current to generate a magnetic field, and the four magnets $1008a_1$, $1008a_2$, $1008a_3$, and $1008a_4$ each independently contribute to an overall magnetic field inside of the beam chamber 1005. The cooling plates 1020 are thermally coupled to a coldhead cylinder via a cooling bar crycooler contact 1021. The cooling bar crycooler contact 1021 may include one or more thermal straps.

Figure 10D:
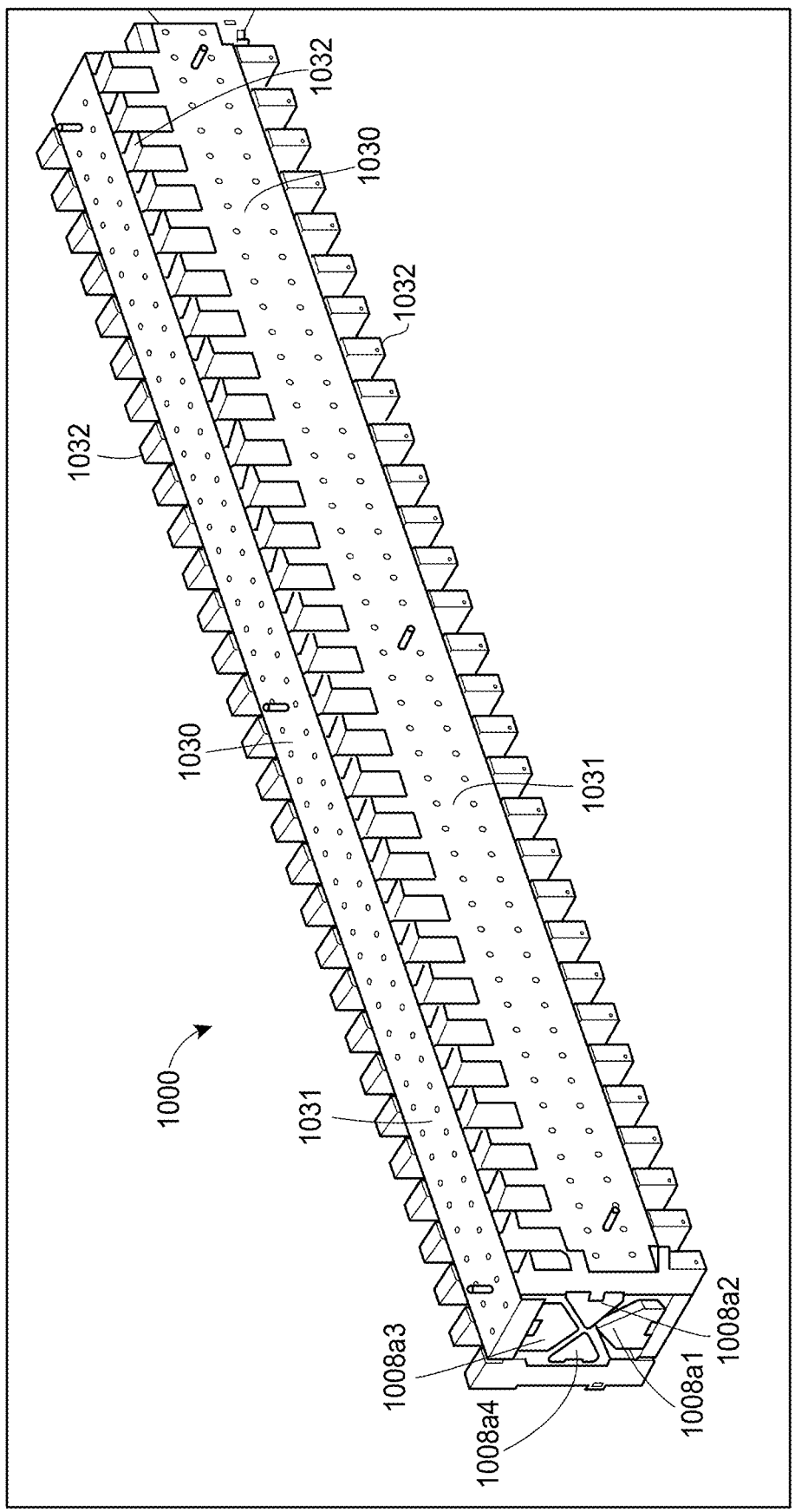
FIG. 10D is a perspective view of a first beam chamber portion of the conductively cooled SCU device including cooling plate supports.

FIG. 10D is a perspective view of the first beam chamber portion 1005a of the conductively cooled SCU device 1000 including the cooling plate supports 1030. The cooling plate supports 1030 have magnet support ribs 1032 that extend from a central plate 1031 of the cooling plate supports 1030. The magnet support ribs 1032 are rectangular structures that protrude from the central plate 1031 to physically and thermally couple top and bottom cooling plate supports 1030 with each of the side cooling plate supports 1030. Each cooling plate support 1030 is physically and thermally coupled to a magnet of the magnets $1008a_1$, $1008a_2$, $1008a_3$, and $1008a_4$ at the central plate 1031 of each respective cooling plate support 1030. Therefore, the cooling plates 1031 and cooling plate supports 1030 form a single structural and thermal entity that is thermally coupled to a two-stage coldhead, through the cooling bar cryocooler contact 1021, and the magnet bundle 1008 to provide thermal control of the magnet bundle 1008. The physical coupling of the cooling plate supports 1030 provides structure stability to the cooling plates and magnets to maintain positions of the magnets. The thermal coupling of the cooling plate supports 1030 allows for improved heat flow and thermal control of the magnets. In embodiments, the magnets $1008a_1$, $1008a_2$, $1008a_3$, and $1008a_4$ may be physically and thermally coupled to the central plates 1031 by fusion, brazing, soldering, by a bolt, screw, clamp or other physical coupling technique. Each of the ribs 1032 of the cooling plates 1030 is interlaced between adjacent fins of the beam chamber cooling fins 1015, as illustrated in FIG. 10B. In embodiments, the ribs 1032 and the cooling fins 1015 may not be in physical contact, and there may be a distance of 2 mm, 5 mm, 10 mm, between 1 and 10 mm, or greater than 10 mm between surfaces of the ribs 1032 and the cooling fins 1015. It may be desirable for the ribs 1032 to not be in physical contact with the cooling fins 1015 to reduce heat exchanged between the beam chamber 1005 and the magnets $1008a_1$, $1008a_2$, $1008a_3$, and $1008a_4$.

Figure 11:
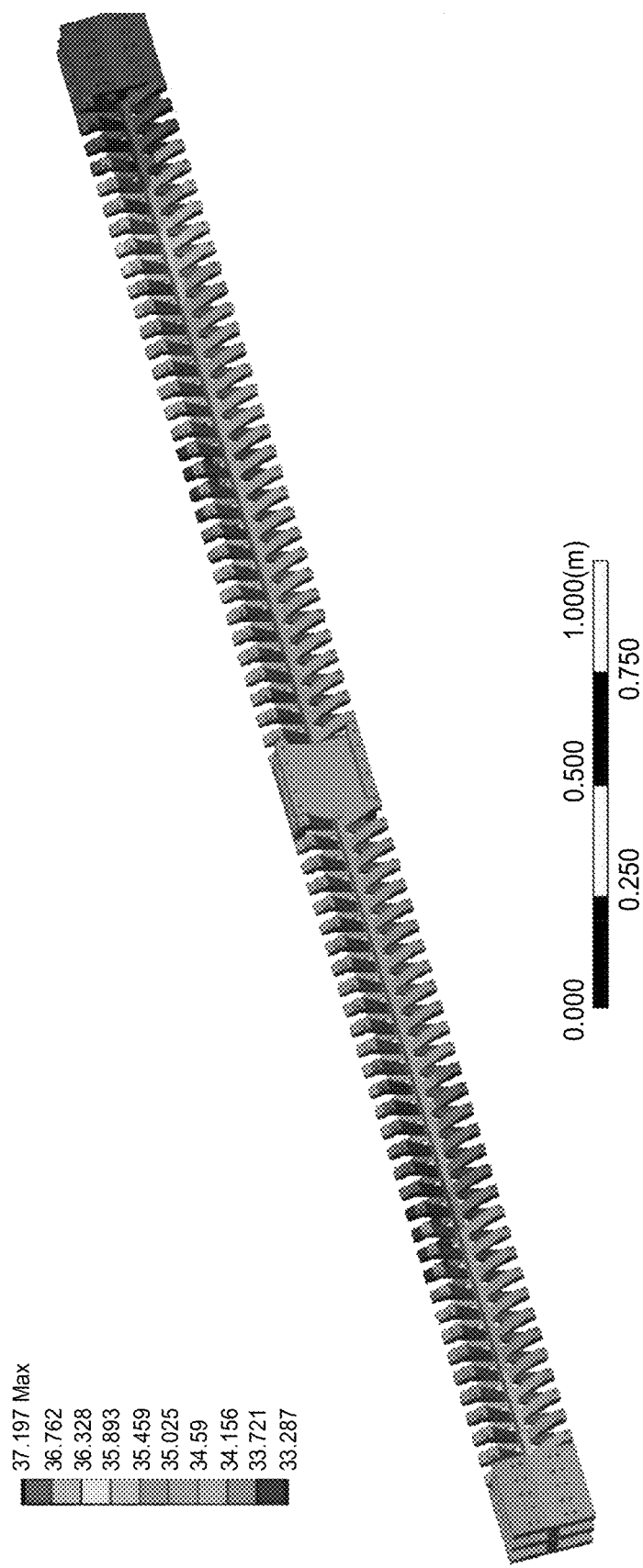
FIG. 11 is a contour plot of a simulated temperature distribution of the beam chamber and beam chamber cooling fins of the conductively cooled SCU device of FIGS. 10A-10C.

FIG. 11 is a contour plot of a simulated temperature distribution of the beam chamber 1005 and the beam chamber cooling fins 1015 of the conductively cooled SCU device 1000 of FIGS. 10A-10D during operation of the SCU device 1000. The temperature range of the beam chamber 1005 was between 33.2 K and 37.2 K with an average temperature of 35.3 K. The total heat load on the beam chamber was found to be 437.18 W at an average temperature of approximately 35 K for the beam chamber. For proper operation of the SCU device 1000 the temperature of the beam chamber 1005 must be maintained below 40 K, which was accomplished.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A conduction cooling apparatus comprising: a beam chamber having a length along a longitudinal axis and a hollow core inside of the beam chamber along the length of the beam chamber, the longitudinal axis being at a center of the hollow core and the beam chamber configured to allow charged particles to pass through the hollow core of the beam chamber along the length of the beam chamber to generate output radiation; a beam chamber holder physically coupled to the beam chamber to maintain the position of the beam chamber, the beam chamber holder being thermally coupled to the beam chamber; one or more magnets physically configured to provide a magnetic field to the hollow core of the beam chamber; one or more cooling bars physically and thermally coupled to the one or more magnets; a magnet suspension beam physically coupled to at least one of the one or more cooling bars, the magnet suspension beam configured to maintain a position of the one or more magnets; and a cooling source thermally coupled to both the beam chamber holder and the one or more cooling bars, the cooling source configured to provide cooling to the beam chamber holder and the one or more cooling bars.

2. A conduction cooling apparatus according to aspect 1, further comprising a cryostat vacuum vessel physically coupled to the magnet suspension beam to provide structural support to the magnet suspension beam to maintain the position of the one or more magnets, and wherein the beam chamber, the beam chamber holder, the one or more magnets, and the magnet suspension beam are disposed inside of the cryostat vacuum vessel.

3. A conduction cooling apparatus according to either aspect 1 or aspect 2, wherein the beam chamber holder is further configured as a thermal shield.

4. A conduction cooling apparatus according to any of aspects 1 to 3, wherein the cooling source comprises: a plurality of single-stage coldheads thermally coupled to the beam chamber holder; and a plurality of two-stage coldheads with a first stage of each of the plurality of two-stage coldheads thermally coupled to the beam chamber holder and a second stage of each of the plurality of two-stage coldheads thermally coupled to the one or more cooling bars.

5. A conduction cooling apparatus according to any of aspects 1 to 4, wherein the beam chamber comprises copper.

6. A conduction cooling apparatus according to any of aspects 1 to 4, wherein the beam chamber comprises aluminum.

7. A conduction cooling apparatus according to any of aspects 1 to 6, wherein the one or more cooling bars comprise copper.

8. A conduction cooling apparatus according to any of aspects 1 to 6, wherein the one or more cooling bars comprise aluminum.

9. A conduction cooling apparatus according to any of aspects 1 to 8, wherein the conduction cooling apparatus is configured to cool the beam chamber to less than 40 Kelvin.

10. A conduction cooling apparatus according to any of aspects 1 to 9, further comprising a plurality of cooling fins, each cooling fin of the plurality of cooling fins having a first end and a second end, wherein the first end of each cooling fin of the plurality of cooling fins is thermally coupled to the beam chamber, and the second end of each of the cooling fins of the plurality of cooling fins is thermally coupled to the beam chamber holder.

11. A conduction cooling apparatus according to aspect 10, further comprising magnet support ribs interlaced between individual fins of the plurality of cooling fins, the magnet support ribs physically coupled to the one or more magnets to maintain a position of the one or more magnets.

12. A conduction cooling apparatus according to any of aspects 1 to 11, further comprising a plurality of intra-magnet suspensions physically coupled to the one or more magnets, the intra-magnet suspensions configured to maintain the positions of each of the one or more magnets with respect to the position of each of the other one or more magnets.

13. A conduction cooling apparatus according to claim 12, wherein the intra-magnet suspensions comprise stainless steel.

14. A conduction cooling apparatus according to any of aspects 1 to 13, wherein the magnet suspension beam comprises titanium.

15. A conduction cooling apparatus according to any of aspects 1 to 14, wherein the length of the beam chamber is greater than four meters.

16. A conduction cooling apparatus according to any of aspects 1 to 15, wherein the one or more magnets comprises magnets having lengths of greater than 1.5 meters along the longitudinal axis of the beam chamber.

17. A conduction cooling apparatus according to any of aspects 1 to 16, wherein the conductive cooling apparatus is configured to provide a cooling capacity of greater than 400 Watts.

18. A conduction cooling apparatus according to any of aspects 1 to 17, wherein the one or more magnets comprises: a first set of four magnets disposed around a first length of the beam chamber along the longitudinal axis; and a second set of four magnets disposed around a second length of the beam chamber along the longitudinal axis.

19. A conduction cooling apparatus comprising: a beam chamber having a hollow core and a length along a longitudinal axis, the beam chamber configured to allow charged particles to pass through the hollow core of the beam chamber along the length of the beam chamber; a beam chamber holder physically coupled to the beam chamber to maintain the position of the beam chamber, the beam chamber holder being thermally coupled to the beam chamber; a first magnet bundle including four magnets, each magnet of the first magnet bundle being physically coupled to another magnet of the first magnet bundle and each magnet of the first magnet bundle disposed around the beam chamber configure to provide a magnetic field to a first length of the hollow core along the longitudinal axis; a second magnet bundle including four magnets, each magnet of the second magnet bundle being physically coupled to another magnet of the second magnet bundle and each magnet of the second magnet bundle disposed around the beam chamber configure to provide a magnetic field to a second length of the hollow core along the longitudinal axis; a first set of four cooling bars, each cooling bar of the first set of four cooling bars thermally coupled to a respective magnet of the first magnet bundle, each of the cooling bars of the first set of four cooling bars further thermally coupled to another cooling bar of the first set of cooling bars; a second set of four cooling bars, each cooling bar of the second set of four cooling bars thermally coupled to a respective magnet of the second magnet bundle, each of the cooling bars of the second set of four cooling bars further thermally coupled to another cooling bar of the second set of four cooling bars; a first magnet suspension beam physically coupled to a cooling bar of the first set of four cooling bars to support the position of the first set of four cooling bars and the first magnet bundle; a second magnet suspension beam physically coupled to a cooling bar of the second set of four cooling bars to support the position of the second set of four cooling bars and the second magnet bundle; a first cooling source thermally coupled to the beam chamber holder and a cooling bar of the first set of four cooling bars, the cooling source configured to provide cooling capacity to the beam chamber holder and the first set of four cooling bars; and a second cooling source thermally coupled to the beam chamber holder and a cooling bar of the second set of four cooling bars, the second cooling source configured to provide cooling capacity to the beam chamber holder and the second set of four cooling bars.

20. A conduction cooling apparatus comprising: a beam chamber having a hollow core and a length along a longitudinal axis, the beam chamber configured to allow charged particles to pass through the hollow core of the beam chamber along the length of the beam chamber; a beam chamber holder physically coupled to the beam chamber to maintain the position of the beam chamber, the beam chamber holder being thermally coupled to the beam chamber; a first magnet section including four magnets, each magnet of the first magnet section disposed around the beam chamber with each magnet of the first magnet section configured to provide a magnetic field to a first length of the hollow core along the longitudinal axis; a second magnet section including four magnets, each magnet of the second magnet section disposed around the beam chamber with each magnet of the second magnet section configured to provide a magnetic field to a second length of the hollow core along the longitudinal axis; a first set of cooling plates, each cooling plate of the first set of cooling plates being thermally coupled to a respective magnet of the first magnet section; a second set of cooling plates, each cooling plate of the second set of cooling plates being thermally coupled to a respective magnet of the second magnet section; a first set of magnet support ribs physically coupled to the first set of cooling plates to maintain a position of each cooling plate of the first set of cooling plates and the first magnet section; a second set of magnet support ribs physically coupled to the second set of cooling plates to maintain a position of each cooling plate of the second set of cooling plates and the second magnet section; a plurality of cooling fins, each cooling fin of the plurality of cooling fins having a first end and a second end, wherein the first end of each cooling fin of the plurality of cooling fins is thermally coupled to the beam chamber, and the second end of each of the cooling fins of the plurality of cooling fins is thermally coupled to the beam chamber holder, and further wherein each cooling fin of the plurality of cooling fins is disposed between adjacent ribs of the first and second sets of magnet support ribs; a first cooling source thermally coupled to the beam chamber holder and a cooling plate of the first set of cooling plates, the first cooling source configured to provide cooling capacity to the beam chamber holder and the first set of cooling plates; and a second cooling source thermally coupled to the beam chamber holder and a cooling plate of the second set of cooling plates, the second cooling source configured to provide cooling capacity to the beam chamber holder and the second set of cooling plates.

What is claimed is:
1. A conduction cooling apparatus comprising:
a beam chamber having a length along a longitudinal axis and a hollow core inside of the beam chamber along the length of the beam chamber, the longitudinal axis being at a center of the hollow core and the beam chamber configured to allow charged particles to pass through the hollow core of the beam chamber along the length of the beam chamber to generate output radiation;
a beam chamber holder physically coupled to the beam chamber to maintain the position of the beam chamber, the beam chamber holder being thermally coupled to the beam chamber;

one or more magnets physically configured to provide a magnetic field to the hollow core of the beam chamber;

one or more cooling bars physically and thermally coupled to the one or more magnets;

a magnet suspension beam physically coupled to at least one of the one or more cooling bars, the magnet suspension beam configured to maintain a position of the one or more magnets; and a cooling source thermally coupled to both the beam chamber holder and the one or more cooling bars, the cooling source configured to provide cooling to the beam chamber holder and the one or more cooling bars.

2. A conduction cooling apparatus according to claim 1, further comprising a cryostat vacuum vessel physically coupled to the magnet suspension beam to provide structural support to the magnet suspension beam to maintain the position of the one or more magnets, and wherein the beam chamber, the beam chamber holder, the one or more magnets, and the magnet suspension beam are disposed inside of the cryostat vacuum vessel.

3. A conduction cooling apparatus according to claim 1, wherein the beam chamber holder is further configured as a thermal shield.

4. A conduction cooling apparatus according to claim 1, wherein the cooling source comprises:
  a plurality of single-stage coldheads thermally coupled to the beam chamber holder; and
  a plurality of two-stage coldheads with a first stage of each of the plurality of two-stage coldheads thermally coupled to the beam chamber holder and a second stage of each of the plurality of two-stage coldheads thermally coupled to the one or more cooling bars.

5. A conduction cooling apparatus according to claim 1, wherein the beam chamber comprises copper.

6. A conduction cooling apparatus according to claim 1, wherein the beam chamber comprises aluminum.

7. A conduction cooling apparatus according to claim 1, wherein the one or more cooling bars comprise copper.

8. A conduction cooling apparatus according to claim 1, wherein the one or more cooling bars comprise aluminum.

9. A conduction cooling apparatus according to claim 1, wherein the conduction cooling apparatus is configured to cool the beam chamber to less than 40 Kelvin.

10. A conduction cooling apparatus according to claim 1, further comprising a plurality of cooling fins, each cooling fin of the plurality of cooling fins having a first end and a second end, wherein the first end of each cooling fin of the plurality of cooling fins is thermally coupled to the beam chamber, and the second end of each of the cooling fins of the plurality of cooling fins is thermally coupled to the beam chamber holder.

11. A conduction cooling apparatus according to claim 10, further comprising magnet support ribs interlaced between individual fins of the plurality of cooling fins, the magnet support ribs physically coupled to the one or more magnets to maintain a position of the one or more magnets.

12. A conduction cooling apparatus according to claim 1, further comprising a plurality of intra-magnet suspensions physically coupled to the one or more magnets, the intra-magnet suspensions configured to maintain the positions of each of the one or more magnets with respect to the position of each of the other one or more magnets.

13. A conduction cooling apparatus according to claim 12, wherein the intra-magnet suspensions comprise stainless steel.

14. A conduction cooling apparatus according to claim 1, wherein the magnet suspension beam comprises titanium.

15. A conduction cooling apparatus according to claim 1, wherein the length of the beam chamber is greater than four meters.

16. A conduction cooling apparatus according to claim 1, wherein the one or more magnets comprises magnets having lengths of greater than 1.5 meters along the longitudinal axis of the beam chamber.

17. A conduction cooling apparatus according to claim 1, wherein the conductive cooling apparatus is configured to provide a cooling capacity of greater than 400 Watts.

18. A conduction cooling apparatus according to claim 1, wherein the one or more magnets comprises:
  a first set of four magnets disposed around a first length of the beam chamber along the longitudinal axis; and
  a second set of four magnets disposed around a second length of the beam chamber along the longitudinal axis.

19. A conduction cooling apparatus comprising:
  a beam chamber having a hollow core and a length along a longitudinal axis, the beam chamber configured to allow charged particles to pass through the hollow core of the beam chamber along the length of the beam chamber;
  a beam chamber holder physically coupled to the beam chamber to maintain the position of the beam chamber, the beam chamber holder being thermally coupled to the beam chamber;
  a first magnet bundle including four magnets, each magnet of the first magnet bundle being physically coupled to another magnet of the first magnet bundle and each magnet of the first magnet bundle disposed around the beam chamber configure to provide a magnetic field to a first length of the hollow core along the longitudinal axis;
  a second magnet bundle including four magnets, each magnet of the second magnet bundle being physically coupled to another magnet of the second magnet bundle and each magnet of the second magnet bundle disposed around the beam chamber configure to provide a magnetic field to a second length of the hollow core along the longitudinal axis;
  a first set of four cooling bars, each cooling bar of the first set of four cooling bars thermally coupled to a respective magnet of the first magnet bundle, each of the cooling bars of the first set of four cooling bars further thermally coupled to another cooling bar of the first set of cooling bars;
  a second set of four cooling bars, each cooling bar of the second set of four cooling bars thermally coupled to a respective magnet of the second magnet bundle, each of the cooling bars of the second set of four cooling bars further thermally coupled to another cooling bar of the second set of four cooling bars;
  a first magnet suspension beam physically coupled to a cooling bar of the first set of four cooling bars to support the position of the first set of four cooling bars and the first magnet bundle;
  a second magnet suspension beam physically coupled to a cooling bar of the second set of four cooling bars to support the position of the second set of four cooling bars and the second magnet bundle;
  a first cooling source thermally coupled to the beam chamber holder and a cooling bar of the first set of four cooling bars, the cooling source configured to provide cooling capacity to the beam chamber holder and the first set of four cooling bars; and
  a second cooling source thermally coupled to the beam chamber holder and a cooling bar of the second set of four cooling bars, the second cooling source configured to provide cooling capacity to the beam chamber holder and the second set of four cooling bars.

20. A conduction cooling apparatus comprising:

a beam chamber having a hollow core and a length along a longitudinal axis, the beam chamber configured to allow charged particles to pass through the hollow core of the beam chamber along the length of the beam chamber;

a beam chamber holder physically coupled to the beam chamber to maintain the position of the beam chamber, the beam chamber holder being thermally coupled to the beam chamber;

a first magnet section including four magnets, each magnet of the first magnet section disposed around the beam chamber with each magnet of the first magnet section configured to provide a magnetic field to a first length of the hollow core along the longitudinal axis;

a second magnet section including four magnets, each magnet of the second magnet section disposed around the beam chamber with each magnet of the second magnet section configured to provide a magnetic field to a second length of the hollow core along the longitudinal axis;

a first set of cooling plates, each cooling plate of the first set of cooling plates being thermally coupled to a respective magnet of the first magnet section;

a second set of cooling plates, each cooling plate of the second set of cooling plates being thermally coupled to a respective magnet of the second magnet section;

a first set of magnet support ribs physically coupled to the first set of cooling plates to maintain a position of each cooling plate of the first set of cooling plates and the first magnet section;

a second set of magnet support ribs physically coupled to the second set of cooling plates to maintain a position of each cooling plate of the second set of cooling plates and the second magnet section;

a plurality of cooling fins, each cooling fin of the plurality of cooling fins having a first end and a second end, wherein the first end of each cooling fin of the plurality of cooling fins is thermally coupled to the beam chamber, and the second end of each of the cooling fins of the plurality of cooling fins is thermally coupled to the beam chamber holder, and further wherein each cooling fin of the plurality of cooling fins is disposed between adjacent ribs of the first and second sets of magnet support ribs;

a first cooling source thermally coupled to the beam chamber holder and a cooling plate of the first set of cooling plates, the first cooling source configured to provide cooling capacity to the beam chamber holder and the first set of cooling plates; and a second cooling source thermally coupled to the beam chamber holder and a cooling plate of the second set of cooling plates, the second cooling source configured to provide cooling capacity to the beam chamber holder and the second set of cooling plates.

* * * * *